April 30, 1946.  A. SIMMON ET AL  2,399,577
CONTRAST CONTROL FOR PHOTOGRAPHIC ENLARGERS AND PRINTERS
Filed June 16, 1944  5 Sheets-Sheet 1
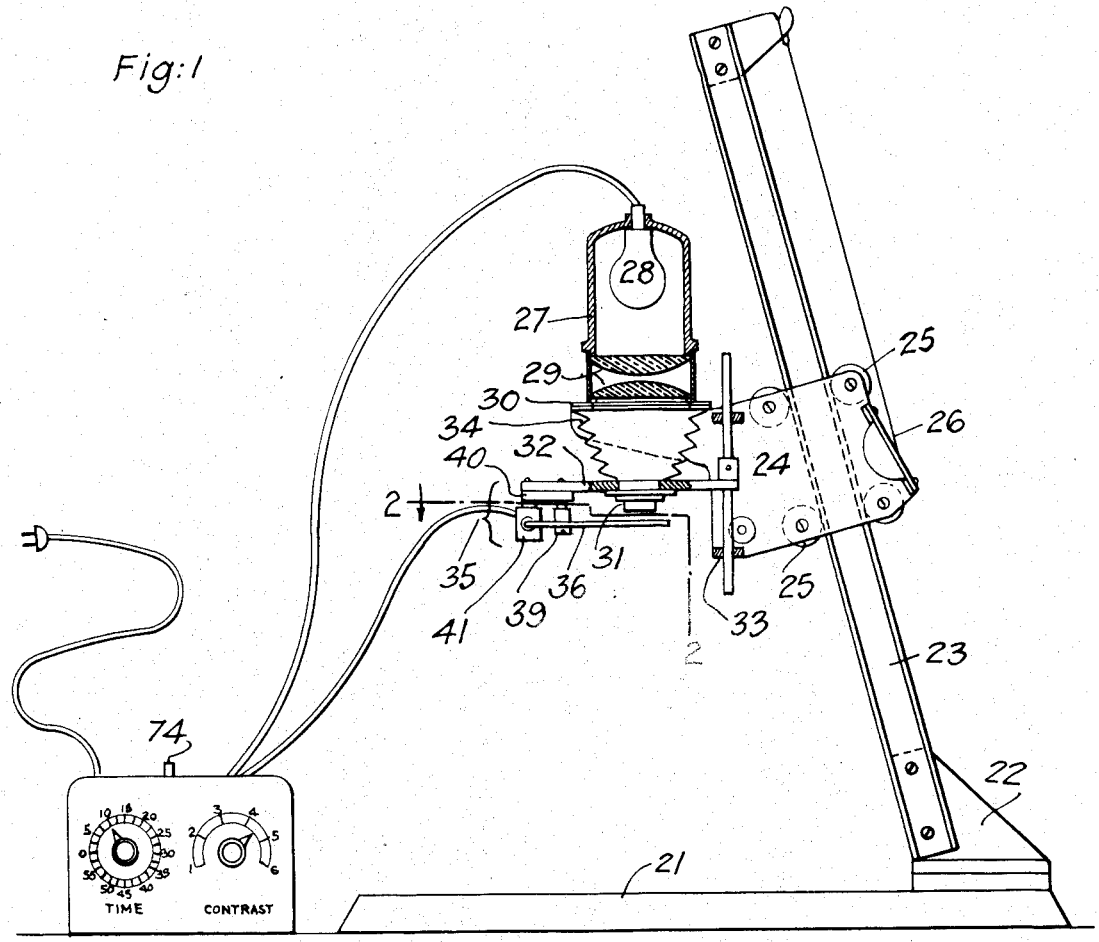
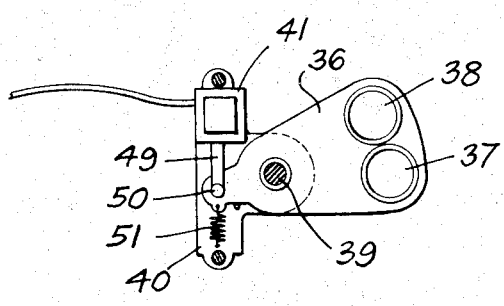
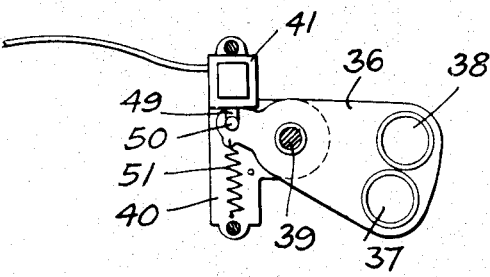
Alfred Simmon
Louis L. Weisglass
INVENTORS
BY Walter E. Wallheim
ATTORNEY.

April 30, 1946.　　A. SIMMON ET AL　　2,399,577
CONTRAST CONTROL FOR PHOTOGRAPHIC ENLARGERS AND PRINTERS
Filed June 16, 1944　　5 Sheets-Sheet 2
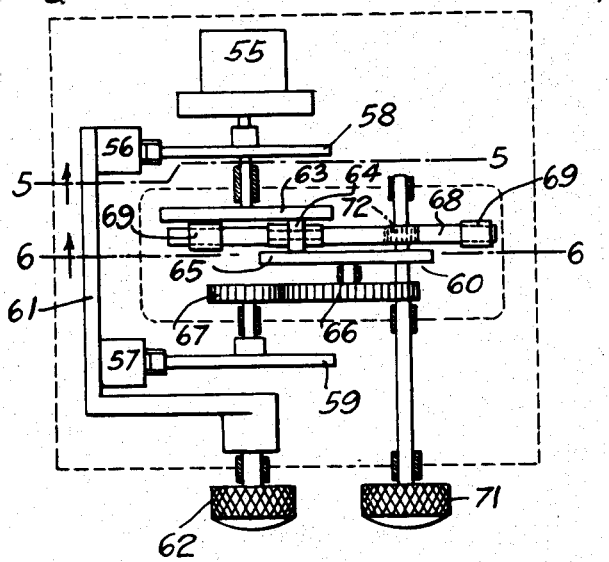
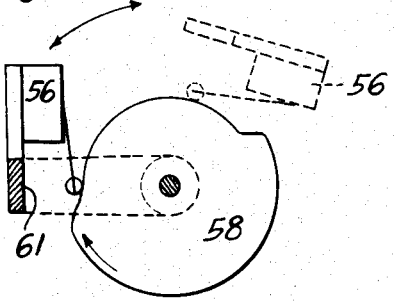
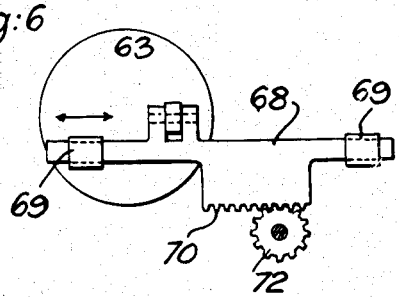
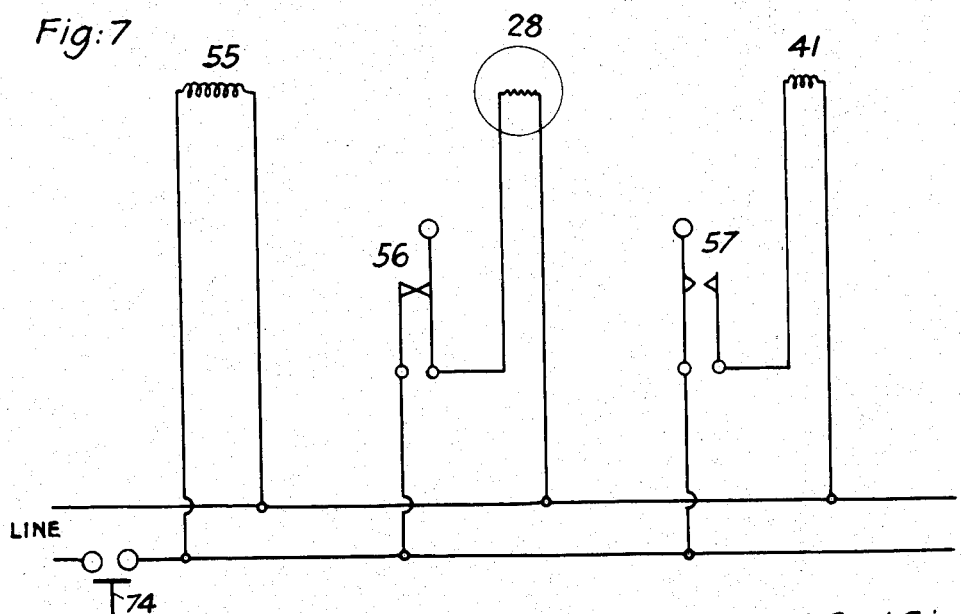
Alfred Simmon
Louis L. Weisglass
INVENTORS
BY Walter E. Wollheim
ATTORNEY.

April 30, 1946.   A. SIMMON ET AL   2,399,577
CONTRAST CONTROL FOR PHOTOGRAPHIC ENLARGERS AND PRINTERS
Filed June 16, 1944   5 Sheets-Sheet 3
Fig: 8
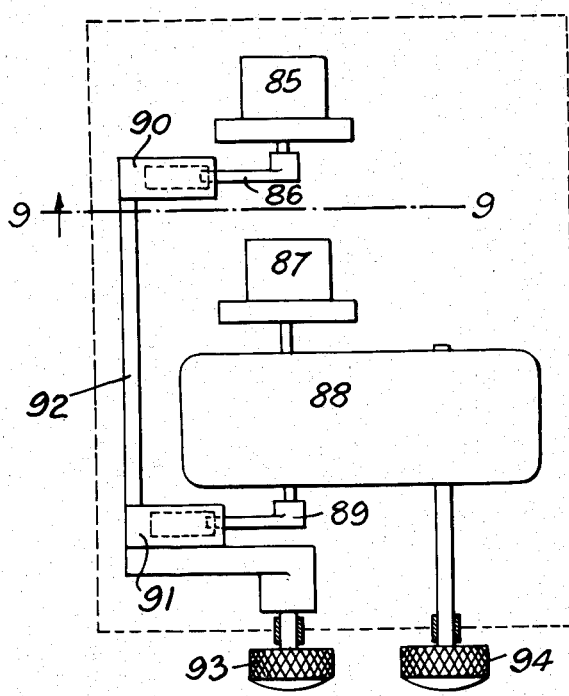
Fig: 9
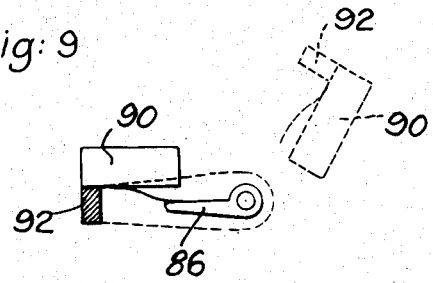
Alfred Simmon
Louis L. Weisglass
INVENTORS.
BY Walter E. Wollheim
ATTORNEY April 30, 1946.   A. SIMMON ET AL   2,399,577
CONTRAST CONTROL FOR PHOTOGRAPHIC ENLARGERS AND PRINTERS
Filed June 16, 1944   5 Sheets-Sheet 4
Fig:10
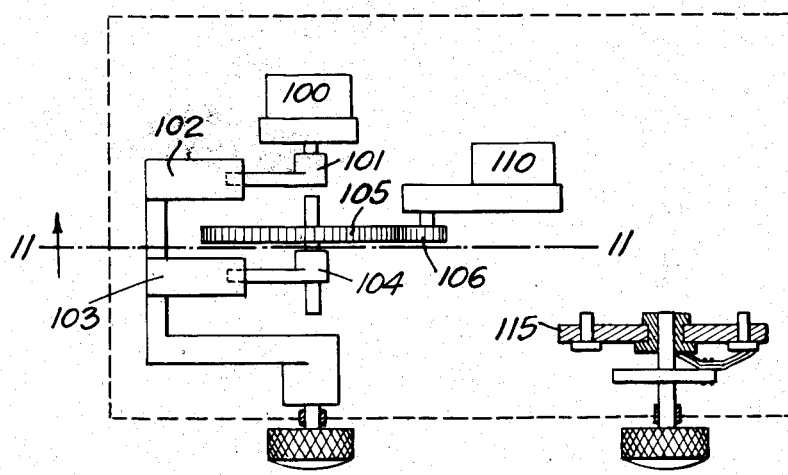
Fig:11
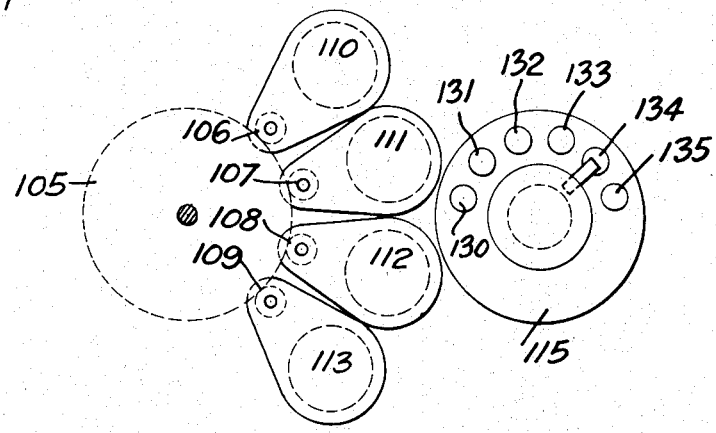
Alfred Simmon
Louis L. Weisglass
INVENTORS
BY Walter E. Wollheim
ATTORNEY.

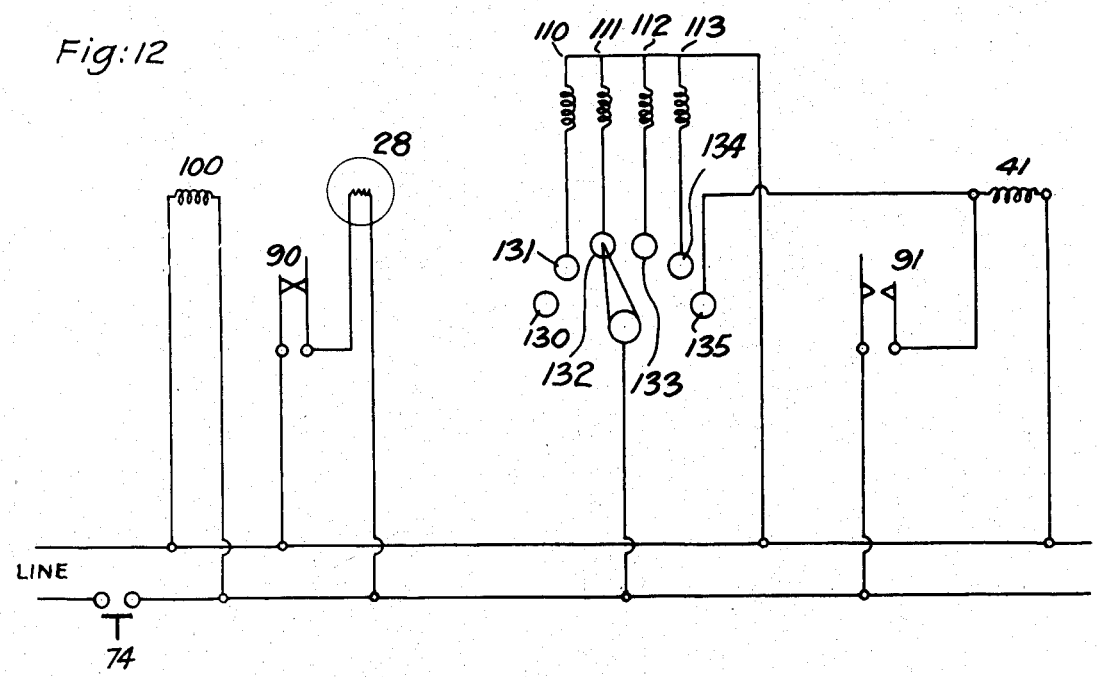
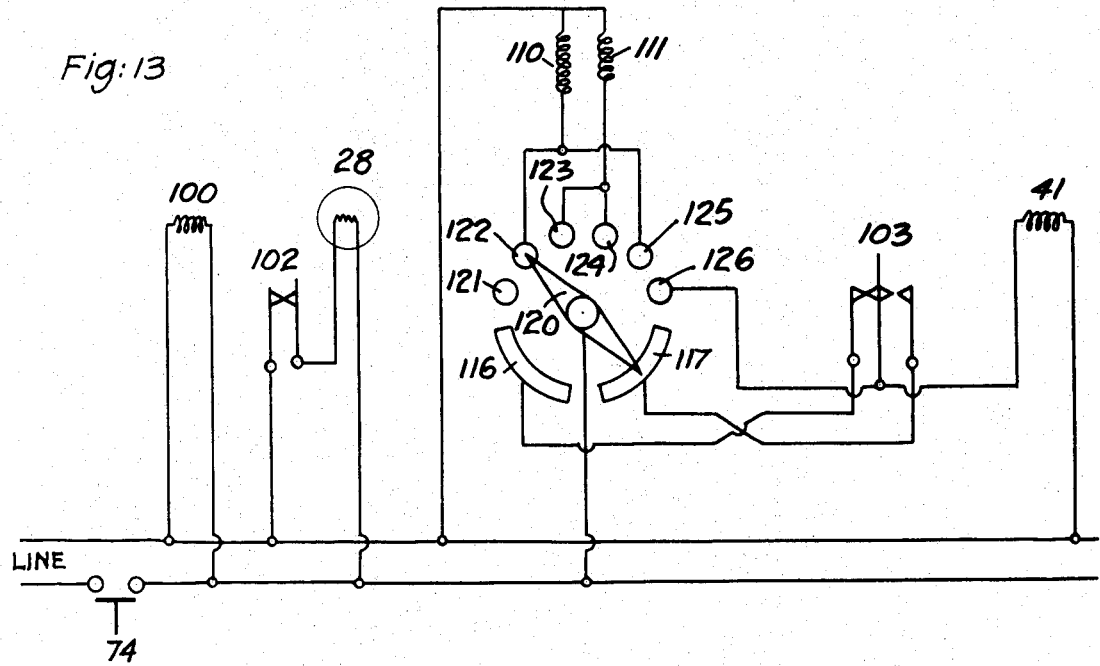

Patented Apr. 30, 1946

2,399,577

UNITED STATES PATENT OFFICE 2,399,577

CONTRAST CONTROL FOR PHOTOGRAPHIC ENLARGERS AND PRINTERS

Alfred Simmon, Jackson Heights, and Louis L. Weisglass, New York, N. Y., assignors, by direct and mesne assignments, to Simmon Brothers, Inc., Long Island City, N. Y., a corporation of New York Application June 16, 1944, Serial No. 540,590

13 Claims. (Cl. 88—24)

A light sensitive paper has recently been developed which is capable of delivering prints of photographic negatives in any degree of contrast from extremely "hard" to extremely "soft" depending upon the wave length of the light to which it is being exposed. With blue light a very high degree of contrast is obtained while with yellow light the gradation is very soft. Intermediate degrees of contrast can be obtained by exposing the paper subsequently to light of either color, the contrast in this case depending upon the ratio of the "blue" exposure time to the "yellow" exposure time. The use of this paper, therefore, necessitates, first, an estimate of the total necessary exposure time, depending upon the density of the photographic negative, and, second, a division of this exposure time into two suitable portions for the "blue" and "yellow" exposure, respectively, depending upon the gradation of the negative, and, finally, a double exposure with the two proper exposure times through a blue and yellow filter, respectively. It is the purpose of this invention to provide mechanical and electrical means to this end.

The general principle of this invention is illustrated in Fig. 1 which shows a photographic enlarger, a filter shifting device, and an automatic time switch which controls the total exposure time, as well as the proportionate share of the two color filters. As shown, the latter adjustment is arbitrarily divided into six divisions, determining the contrast of the print.

It will be understood that the enlarger shown in these drawings is merely a typical example and that enlargers of other designs, as well as contact printers, can be equally well used with this invention.

The enlarger shown in this instance consists of a baseboard 21 on which a suitable bracket 22 is mounted. Fastened to this bracket are U channels 23 on which a projector carriage 24 slides. This movement is facilitated by rollers 25, and the weight of the entire projector assembly is counter-balanced by a spring 26. The projector proper comprises a lamphousing 27, containing an incandescent lamp 28 and a double condenser 29. Immediately under the condenser is positioned a holder 30 for the photographic negative. A lens 31 projects an enlarged image of the negative onto the baseboard 21 which, during exposure, supports the light sensitive paper. The lens 31 is mounted on a lens carrier 32, the position of which can be adjusted vertically with respect to the negative 30 by means of a friction drive 33. This drive is actuated by the operator until a sharp image of the photographic negative appears in the plane of the sensitive or bromide paper. The lens carrier is connected to the film-holder 30 by means of a flexible but light-tight bellows 34. It will be understood that up to this point the enlarger as described is quite conventional.

In front of the lens is shown a color filter assembly 35 and this assembly is shown in detail in Figs. 2 and 3 which are cross sectional views along the plane of line 2—2 in Fig. 1. It consists of a pivoted plate 36 which supports a yellow filter 37 and a blue filter 38. The plate 36 can perform a rotary motion around pivot 39 which is fastened to a stationary base plate 40 which, in turn, is fastened to the above mentioned lens carrier 32. Fastened to this base plate 40 is a solenoid 41 which, by means of a connecting rod 49, engages plate 36 at a point 50. A spring 51 is provided holding the filter support 36 ordinarily in the position shown in Fig. 2. As soon as solenoid 41 is energized, it moves the connecting rod 49 and thereby rotates the filter support 36, so that it now assumes a position shown in Fig. 3. It is understood that the force of the solenoid is considerably stronger than the force of spring 51. It will be clear that with this arrangement, yellow filter 37 is in front of the lens as long as the solenoid is not energized, and blue filter 38 is in front of the lens as soon as current is supplied to solenoid 41.

This electrically operated filter changing device can, of course, be widely modified. For example, it may be advantageous to use a small torque motor instead of a magnet since this is less liable to introduce vibrations. It may also be advisable to position the filter assembly not immediately in front of the lens, but between the lens and the negative, or between the negative and the condenser, or between the lamp and the condenser. The filter carrier 36 may also, instead of a rotary motion, perform a straight line sliding motion. Modifications of this nature, which are obvious to anybody skilled in the art, fall, of course, within the scope of this invention.

The basic form of an automatic time switch is shown in Figs. 4, 5, 6 and 7. This switch, as explained above, controls the total exposure time as well as the ratio of the "blue" and "yellow" exposure time, respectively. It comprises a motor 55, two switches 56 and 57, for the lamp and for the filter shifting devices, respectively, two rotating switch actuating elements 58 and 59, and a variable speed transmission 60.

The motor is preferably a small synchronous motor, such as used for electrical clocks. These motors are commercially available with a built-in speed reducing gear train of any desidered ratio and with a magnetically operated gear shift which automatically engages and disengages the gear train when the motor is energized and deenergized. The drive shaft is then free to be returned to the starting position by a spring. All motors shown, more or less diagrammatically, in these drawings and referred to in the specifications are understood to be motors of this type.

The two switches 56 and 57 are preferably so-called "microswitches" and are mounted on a common arm 61 which can be rotated by means of knob 62. This rotary movement controls the times which will elapse before the switch actuating elements 58 and 59 can actuate the switches 56 and 57. Switch 56 is normally closed and is in series with the incandescent lamp 28, thus controlling the exposure time. Switch 57 is normally open and is in series with solenoid 41, thus controlling the shift from one color to the other.

Fig. 5 is a cross-sectional view along the plane of line 5—5 in Fig. 4 showing the relative position of the switch actuating elements 58 and switch 56; a similar cross-sectional view showing switch actuating elements 59 and switch 57 would be identical to Fig. 5. In Fig. 5 we have shown switch 56 as set for a very short time interval because, obviously, it requires only a very small amount of angular travel of cam 58 to actuate switch 56. As mentioned before, this time interval can be adjusted by rotating knurled knob 62, and we have shown, in dotted lines, an alternate position of switch 56 which shows this switch as set for a relatively long time interval.

As shown in Fig. 4, switch actuating element 58 is fixedly attached to the shaft of motor 55, but switch actuating element 59 is driven by the motor through the medium of a variable speed transmission 60. This variable speed transmission may be of any conceivable design and we have, merely as an illustration, shown a simple friction drive. This friction drive comprises a disc 63, a small roller 64, a second disc 65, and two gears 66 and 67. Fig. 6 is a cross-sectional view along the plane of line 6—6 in Fig. 4. This Fig. 6 shows the means by which roller 64 can be shifted in the direction of the arrows for speed adjusting purposes. Roller 64 is mounted on a bracket 68 which can slide in bearings 69. The position of this bracket 68 can be controlled by rotating a small pinion 72 which meshes with the teeth of a rack 70. The pinion 72 can be rotated by means of knurled knob 71. It will be obvious that by rotating pinion 72, bracket 68 and, therefore, roller 64 slides either to the right or to the left. With the roller shifted as far to the left as possible, disc 65 will move relatively slowly, and with the roller 64 shifted as far to the right as possible, disc 65 will move relatively fast. This rotary movement will be transmitted through gears 66 and 67 to the switch actuating element 59. The ratio of the various elements must be selected in such a manner that the slowest speed of switch actuating element 59 is at least the same as, or slightly faster, than the speed of the directly driven switch actuating element 58.

The electrical circuit of this time switch is shown in Fig. 7. A line, usually 110 v., 60 cycle, is fed into the circuit from the left through a normally open push button 74. Three parallel circuits are provided, one feeding the motor 55, the second feeding the lamp 28 through switch 56, and the third feeding solenoid 41 through switch 57. As soon as the operator depresses push button 74, motor 55 begins to run and lamp 28 lights up. Solenoid 41 is not actuated for the time being, since switch 57 is still open. Depending upon the position of switch 56, as controlled by knob 62, a certain time elapses before cam 58 depresses switch 56, thereby opening the lamp circuit. The total exposure time is thus controlled. Cam 59 rotates faster than cam 58, how much faster depending upon the adjustment of variable drive 60 as controlled by knob 71, and cam 59 will, therefore, depress switch 57 sometime before cam 58 depresses switch 56. Actuation of switch 57 closes the circuit for the solenoid 41, thereby effecting a shift from one colored filter to the other one. Consequently, the enlarger will, for example, expose the bromide paper with yellow light for the first portion of the exposure, i. e. until the actuation of switch 57, and will expose it for the balance of the exposure with blue light until the lamp circuit is interrupted by actuation of switch 56. After the exposure the operator will, of course, relinquish his hold on push button 74, whereupon the entire circuit becomes deenergized. As explained above, the motor 55 is equipped with a magnetically operated gear shift which automatically disengages the gear train when the motor is deenergized so that the elements driven by this motor are free to return to their respective starting positions. It will be understood that suitable springs are provided for this purpose, these springs not having been shown in the drawings.

Since both switch actuating elements 58 and 59 are in this case driven by the same motor, at least one of these switch actuating elements 59 must be shaped in such a manner that its mechanical contact with switch 57 does not impede further rotation of the motor. This can be done by giving element 59 the shape of a cam, such as shown in Fig. 5. It will be clear that this cam, therefore, must comprise two halves of approximately 180° each and that, therefore, only 180° of the dial of knob 62 can be utilized.

This disadvantage can be overcome by providing two individual motors to drive the two switch actuating elements. A timer of this type is shown in Figs. 8 and 9. In this case, the dial can be spread almost over the entire 360°. Referring to Fig. 8, we have one motor 85, driving a switch actuating element 86 and another motor 87, driving through a variable speed transmission 88, and a switch actuating element 89. Two switches 90 and 91 are mounted on an arm 92 which again can be adjusted by means of a knurled knob 93. The variable speed transmission 88 is identical in structure to the transmission shown in Figs 4 and 6. Its speed ratio can be adjusted by means of a knurled knob 94. Fig. 9 is a cross-sectional view along the plane of line 9—9 in Fig. 8. It is, in this case, no longer necessary to use cams as switch actuating elements, but simple arms can be used to depress the switches, since it is now possible to stall motor 87 after the completion of its run until the total exposure time, as controlled by motor 85, has expired.

This has the advantage that now practically 360° are available for the speed dial. In Fig. 9 we have again shown switch 90 as set for a very short exposure, since in this position obviously only a very short travel of arm 86 is necessary in order to actuate switch 90. We have also shown, in dotted lines, switch 90 in an alternate position as set for a longer time. The circuit of this timer is identical with the circuit shown in Fig. 7, except that, instead of one motor 55, the two motors 85 and 87 would be connected in parallel in its place.

It will be understood that this general scheme can be widely modified, particularly with regard to the variable speed transmission 88. Not only can any conceivable type of mechanically adjustable speed transmission be used, such as the numerous friction drives which are well known in the art, or the various types of gear shifts, but it is also possible to use an electrical motor with variable speed characteristics to drive the second switch actuating element. Motors of this type are well known; for example, an ordinary series wound motor with a suitable rheostat or a variable speed motor controlled by thyratron circuits or the like. Modifications of this type should be construed to fall within the scope of this invention as long as one adheres to the broad principle of having two rotating switch actuating elements, a first one rotating with a fixed speed and controlling the total exposure time, and a second one rotating faster than the first one with an adjustable speed and controlling the instance when the filter is shifted from one color to the other, the switches for both circuits being mounted on a common rotating arm by means of which both timing circuits are being controlled simultaneously by the operator.

A particularly simple arrangement results if we provide, for the second switch actuating element, instead of a single motor and a variable speed drive, a plurality of motors, with progressively different speeds of the output shaft, of course. An arrangement of this type is shown in Figs. 10, 11, and the associated electrical circuit in Fig. 12. The total exposure time is again controlled by a motor 100 driving a first switch actuating element 101 which is identical in shape to the arm 86 shown in Fig. 9. Arm 101 actuates a switch 102 which controls the lamp, and thereby the total exposure time. The instance of the color shift is controlled by a switch 103 which is actuated by an arm 104 which is again identical in shape to arm 86 in Fig. 6. This arm is driven by a relatively large spur gear 105 which is also shown diagrammatically in Fig. 11 which represents a cross-sectional view along the plane of line 11 in Fig. 10. This spur gear meshes with four pinions 106, 107, 108, 109 which are mounted to the output shafts of the four motors 110, 111, 112, 113. These motors are small synchronous motors complete with built-in gear reductions of different ratios and automatic magnetic gear shifts which disconnect the output shafts automatically upon deenergization of the motor. Only one motor is energized at any given time, depending upon the position of a simple selector switch, and this motor drives gear 105 and arm 104. The pinions of all other, deenergized, motors are automatically disconnected from their respective rotors as explained above, and are simply rotating idly with gear 105. The gear reductions, of course, all have different ratios so that the speed of master gear 105 can now be controlled by the selector switch. The selector switch is shown in Figs. 10 and 11 and is of the well known and conventional construction. The electrical circuit is shown in Fig. 12 and is, in most respects, identical to the one shown in Fig. 7 except that, of course, instead of a single motor, a plurality of motors, with a selector switch, is provide to drive the second switch actuating element. It will be noted that with four motors provided for this purpose it is possible to provide six steps because, at the first step, 100% yellow, we leave the circuit open, button 130 unconnected, so that the solenoid 41 is never energized, and because at the last step, 100% blue or zero per cent yellow, we connect button 135 directly to the solenoid, thereby by-passing switch 103, so that solenoid 41 is always energized. The speed of motors 110, 111, 112, 113 must be 1¼ (=⅘), 1⅔ (=⅗), 2½ (=⅖), and 5 times, respectively, the speed of motor 100, so that the color shift occurs after 80%, 60%, 40%, and 20%, respectively, of the total exposure time. This means that together with the two extreme positions, just described, we can get any ratio from 100% yellow, button 130, to zero per cent yellow, button 135, in steps of 20%.

The number of motors necessary to drive the second switch actuating element can be reduced by half by the following expedient: Switch 103 is now normally open and, consequently, the first portion of the exposure time will be "yellow" with the solenoid deenergized. Obviously, we could just as well provide a normally closed switch so that the first portion of the exposure time would be "blue" with the solenoid energized. We can now go one step further and provide a single pole double throw switch together with an automatic switch-over device, using a normally open switch for the first half of the dial and a normally closed switch for the second half of the dial. This means that we can use the same motor for a certain percentage of "blue" exposure time in one case and for the identical percentage of "yellow" in the other case. Now, obviously, for example, a 20% "yellow" exposure time is the same as an 80% "blue" exposure time. We can, therefore, always obtain two complementary values, such as 20—80, or 40—60, from the same motor. A circuit of this type is shown in Fig. 13, and we can see that there we obtain six steps by using altogether three motors, one for the total exposure time and two to control the color shift. The speed of motor 110 would, in this case, be 1¼ times the speed of motor 100 and the speed of motor 111 will be 1⅔ times the speed of motor 100. A selector switch 115 has six buttons 121, 122, 123, 124, 125, 126, a double ended switch blade 120 and two switch segments 116 and 117 which are connected to the normally closed and normally open sides of switch 103, respectively. In the first position we see that button 126 is not connected to anything, which simply means that the solenoid remains deenergized all the time so that we obtain a 100% yellow exposure. In the second position, the one shown in drawings, the color shift is controlled by motor 110 which runs 1¼ times as fast as motor 100 or the time during which the solenoid remains deenergized during the exposure amounts to 80% of the total exposure time. If we shift blade 120 to button 123 the color shift is controlled by motor 111 which runs 1⅔ times as fast as motor 100 or the solenoid remains deenergized for 60% of the total exposure time. If we go one step further and connect blade 120 to button 124, the color shift is still energized by motor 111, but the other end of blade 120 is now connected to segment 116 so that switch 103 is closed instead of open for the first portion of the exposure time. Therefore, we have now a 60% "blue" exposure time which is, of course, equivalent to a 40% "yellow" exposure time. If we progress one step further to button 125 the color shift is again controlled by motor 110 which runs 1¼ times as fast as motor 100 or the color shift takes place after 80% of the total exposure time has elapsed. Again, the normally closed side of switch 103 is utilized or we obtain a 80% "blue" exposure time which is equivalent to 20% "yellow" exposure time. The wire from the last switch button 126 by-passes the switch 103 entirely and, as soon as blade 120 is connected to this button 126, the exposure will be 100% blue, or zero per cent yellow, because the solenoid will, in this case, be energized all the time.

The examples decribed above and shown in Figs. 12 and 13 are, of course, merely representative examples, six steps having been chosen because six appears to be a practical number. Any other number can, of course, be provided should this appear desirable, and we can express the necessary speed of the second switch actuating element, as driven by the various motors in the following manner: If we call X the number of steps desired and N the number of revolutions per minute of the motor driving the first switch actuating element, the speed of the second switch actuating element may be represented by the following series:

$$\left(\frac{X-1}{1}\right)N, \left(\frac{X-1}{2}\right)N, \left(\frac{X-1}{3}\right)N \ldots$$

$$\left(\frac{X-1}{X-4}\right)N, \left(\frac{X-1}{X-3}\right)N, \left(\frac{X-1}{X-2}\right)N$$

In the case of Fig. 13, we must make a distinction whether the number of steps chosen is an even or an odd number. Generally an even number is preferable because any even number of steps can be obtained with the same number of motors as the next lower odd number of steps. Odd numbers, however, have the advantage that it is possible to get a 50% blue and a 50% yellow exposure which occasionally may be desired.

In either case, we can choose the speeds of the second switch actuating element from either the high or the low end of the series written above. We have, therefore, the following four cases:

With an even number of steps the output speeds of the second switch actuating element will either be:

$$\left(\frac{X-1}{1}\right)N, \left(\frac{X-1}{2}\right)N, \left(\frac{X-1}{3}\right)N \ldots \left(\frac{X-1}{\frac{X}{2}-1}\right)N$$

or it will be:

$$\left(\frac{X-1}{X-2}\right)N, \left(\frac{X-1}{X-3}\right)N \ldots \left(\frac{X-1}{X/2}\right)N$$

With an odd number of steps the output speed will either be:

$$\left(\frac{X-1}{1}\right)N, \left(\frac{X-1}{2}\right)N \ldots 2N$$

or it will be:

$$\left(\frac{X-1}{X-2}\right)N, \left(\frac{X-1}{X-3}\right)N \ldots 2N$$

It is, of course, clear that many features of the device for contrast control described above can be modified and many possibilities have been pointed out in the specifications. Many others will occur to anybody skilled in the art. For example, the enlarger or printer may use as a source of light, instead of a tungsten filament incandescent lamp, a fluorescent, or more generally, any gaseous conductor lamp. These lamps cannot readily be switched on and off and are, generally used for photographic purposes in connection with a mechanical shutter which will be actuated by a solenoid or a motor. It will be obvious that the circuit diagrams, Fig. 7, 12 and 13, are fully applicable in this case as soon as we substitute the shutter coil or the like for the tungsten filament lamp. Obvious modifications of this kind shall, of course, fall within the scope of this invention.

What we claim as new, is:

1. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including at least one motor, a first switch controlling said source of light, a first rotating switch actuating element driven by said motor and actuating said first switch, a second switch controlling said electromagnetic means for the filter shift, a second rotating switch actuating element actuating said second switch, and a variable speed drive, operatively connected to said motor, driving said second switch actuating element.

2. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including at least one electric motor, a first switch controlling said source of light, a first rotating switch actuating element driven by said motor and actuating said first switch, a second switch controlling said electromagnetic means for the filter shift, a second rotating switch actuating element actuating said second switch, and a variable speed drive, operatively connected to said motor, driving said second switch actuating element, both switches being mounted on a common angularly adjustable support.

3. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including at least one electric motor, a first switch controlling said source of light, a first rotating switch actuating element driven by said motor and actuating said first switch, a second switch controlling said electromagnetic means for the filter shift, a second rotating switch actuating element actuating said second switch, and a variable speed drive, operatively connected to said motor, driving said second switch actuating element, the speed of rotation of said second switch actuating element being at all times higher than the speed of rotation of said first switch actuating element.

4. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including two electric motors, a first switch controlling said source of light, a first rotating switch actuating element driven by the first of said motors and actuating said first switch, a second switch controlling said electromagnetic means for the filter shift, a second rotating switch actuating element actuating said second switch, and driven by the second of said motors, and means to adjust the speed of rotation of said second switch actuating element.

5. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including a first rotating switch actuating element, a first switch controlling the total exposure time and actuated by said first switch actuating element, a first motor driving said first switch actuating element, a second rotating switch actuating element, a second switch controlling said electromagnetic filter shifting device and actuated by said second switch actuating element, a plurality of motors adapted to drive said second switch actuating element, said motors being equipped with reduction gears of different ratios, and a switch to connect selectively one of said motors to the supply line.

6. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including a first rotating switch actuating element, a first switch controlling the total exposure time and actuated by said first switch actuating element, a first motor driving said first switch actuating element, a second rotating switch actuating element, a second switch controlling said electromagnetic filter shifting device and actuated by said second switch actuating element, a plurality of motors adapted to drive said second switch actuating element, said motors being equipped with reduction gears of different ratios, and a switch to connect selectively one of said motors to the supply line, said selector switch comprising a rotatable switch blade and a number of switch buttons, the first of said buttons being unconnected, each of the following buttons being connected, respectively, to one of the motors driving said second actuating element, and the last of said switch buttons being connected to the electromagnetic filter shifting means.

7. A contrast control device for photographic enlargers and printers, comprising a source of light, a filter shifting device, and a timing device, said filter shifting device comprising two colored filters of different colors and electromagnetic means to shift either of said filters into a position between said source of light and light sensitive material, said timing device including a first rotating switch actuating element, a first switch controlling the total exposure time and actuated by said first switch actuating element, a first motor driving said first switch actuating element, a second rotating switch actuating element, a second switch of the double throw type controlling said electromagnetic filter shifting device and actuated by said second switch actuating element, a plurality of motors adapted to drive said second switch actuating element, said motors being equipped with reduction gears of different ratios, and a switch to connect selectively one of said motors to the supply line, and switching means associated with said selector switch to use the normally open side of said double throw type switch during one half of the rotary movement of said selector switch, and the normally closed side during the other half.

8. A contrast control device for photographic enlargers and printers, comprising a source of light, a filter shifting device, and a timing device, said filter shifting device including two colored filters of different colors and electromagnetic means to shift either of said filters into a position between said source of light and light sensitive material, said timing device including a first rotating switch actuating element, a first switch controlling the total exposure time and actuated by said first switch actuating element, a first motor driving said first switch actuating element, a second rotating switch actuating element, a second switch of the double throw type controlling said electromagnetic filter shifting device and actuated by said second switch actuating element, a plurality of motors adapted to drive said second switch actuating element, said motors being equipped with reduction gears of different ratios, and a selector switch including a rotatable double ended switch blade connected to one side of the line, a number of switch buttons arranged substantially in a semi-circle, and two switch segments diametrically opposite said semi-circle of switch buttons, each segment occupying substantially one quarter of a complete circle, the first switch button being unconnected, the second switch button being connected to the second last button and to one side of the first motor, the third switch button being connected to the third last button and to one side of the second motor, and subsequent buttons, connected in like manner, the last switch button being connected to one side of the electromagnetic filter shifting means, the first of said segments being connected to the normally open contact, and the second of said segments, being connected to the normally closed contact of said double throw switch, the center contact of said double throw switch being connected to the same side of the electromagnetic filter shifting means as the last switch button, and the other side of all motors and the other side of the electromagnetic means being connected to the other side of the line.

9. A contrast control device as described in claim 6, the selective switch having X steps and the motor driving the first switch actuating element performing N revolutions per second, the speed of the motors driving the second switch actuating element being such as to drive said element with the following speeds:

$$\left(\frac{X-1}{1}\right)N, \left(\frac{X-1}{2}\right)N, \left(\frac{X-1}{3}\right)N \ldots$$
$$\left(\frac{X-1}{X-4}\right)N, \left(\frac{X-1}{X-3}\right)N, \left(\frac{X-1}{X-2}\right)N$$

10. A contrast control device as described in claim 7, the selective switch having X steps, X being an even number, and the motor driving the first switch actuating element performing N revolutions per second, the speed of the motors driving the second switch actuating element being such as to drive said element with the following speeds:

$$\left(\frac{X-1}{1}\right)N, \left(\frac{X-1}{2}\right)N, \left(\frac{X-1}{3}\right)N \ldots \left(\frac{X-1}{\frac{X}{2}-1}\right)N$$

11. A contrast control device as described in claim 7, the selective switch having X steps, X being an even number, and the motor driving the first switch actuating element performing N revolutions per second, the speed of the motors driving the second switch actuating element being such as to drive said element with the following speeds:

$$\left(\frac{X-1}{X-2}\right)N, \left(\frac{X-1}{X-3}\right)N \ldots \left(\frac{X-1}{X/2}\right)N$$

12. A contrast control device as described in claim 7, the selective switch having X steps, X being an odd number, and the motor driving the first switch actuating element performing N revolutions per second, the speed of the motors driving the second switch actuating element being such as to drive said element with the following speeds:

$$\left(\frac{X-1}{1}\right)N, \left(\frac{X-1}{2}\right)N, \left(\frac{X-1}{3}\right)N \ldots 2N$$

13. A contrast control device as described in claim 7, the selective switch having X steps, X being an odd number, and the motor driving the first switch actuating element performing N revolutions per second, the speed of the motors driving the second switch actuating element being such as to drive said element with the following speeds:

$$\left(\frac{X-1}{X-2}\right)N, \left(\frac{X-1}{X-3}\right)N, \left(\frac{X-1}{X-4}\right)N \ldots 2N$$

ALFRED SIMMON.
LOUIS L. WEISGLASS.